United States Patent [19]
Jasper et al.

[11] Patent Number: 5,595,053
[45] Date of Patent: Jan. 21, 1997

[54] HARVESTING MACHINE REEL

[75] Inventors: Edward P. Jasper; James M. Frederick; Joshua U. Echelbarger, all of Mendota, Ill.

[73] Assignee: HCC Inc., Mendota, Ill.

[21] Appl. No.: 396,920

[22] Filed: Mar. 1, 1995

[51] Int. Cl.⁶ .................................................. A01D 65/04
[52] U.S. Cl. .................. 56/226; 56/227; 56/364; 56/400
[58] Field of Search ................. 56/400, 364, 400.21, 56/221, 226, 227; 460/121, 122

[56]  References Cited

U.S. PATENT DOCUMENTS

| | | | |
|---|---|---|---|
| 2,380,173 | 7/1945 | Harrison | 56/226 |
| 3,148,494 | 9/1964 | Scheidenhelm | 56/400 |
| 3,302,378 | 2/1967 | Rasmussen | 56/328 |
| 3,613,346 | 10/1971 | Hubbard | 56/400 |
| 3,771,299 | 11/1973 | Gradwohl et al. | 56/220 |
| 3,796,030 | 3/1974 | Neal et al. | 56/220 |
| 4,008,558 | 2/1977 | Mott | 56/226 |
| 4,067,177 | 1/1978 | Tout | 56/226 |
| 4,255,921 | 3/1981 | Kirby | 56/220 |
| 4,467,591 | 8/1984 | Dynie | 56/364 X |
| 4,520,620 | 6/1985 | Gessel et al. | 56/400 |
| 4,630,432 | 12/1986 | Love et al. | 56/400 X |
| 4,776,155 | 10/1988 | Fox et al. | 56/227 X |
| 4,882,899 | 11/1989 | Jasper et al. | 56/220 |
| 5,007,235 | 4/1991 | Nickel et al. | 56/12.4 |

*Primary Examiner*—Terry Lee Melius
*Assistant Examiner*—Heather Chun Shackelford
*Attorney, Agent, or Firm*—Michael, Best and Friedrich

[57]  ABSTRACT

A reel for a harvesting machine includes a plurality of circumferentially spaced radially extending support arms, a plurality of axially extending bat tubes rotatably supported on the outer end portions of the support arms, a plurality of axially spaced tines, preferably made from a synthetic thermoplastic or thermosetting material, mounted on each bat tube and a spring having one end connected to each bat tube and a support carried by the reel. The spring holds the bat tube in an operating position where the tines are at a predetermined angular orientation relative to the rotational axis of the reel during normal operation. If one or more tines on one bat tube engages a plug of wet hay or other obstruction, the spring permits the bat tube to rotate in a direction opposite to the rotational direction of the reel to a deflected position where the tine(s) can ride over the obstruction.

17 Claims, 3 Drawing Sheets

HARVESTING MACHINE REEL

BACKGROUND OF THE INVENTION

1. Field of the Invention

This invention relates to reels for harvesting machines, such as mower/conditioners, combines, hay balers, forage harvesters, hay rakes and the like and, more particularly, to such reels including tines and means for permitting the tines to deflect and ride over substantially immovable objects encountered by the tines during operation of the harvesting machine.

2. Description of the Prior Art

Hay harvesting machines, such as self-propelled and tractor-pulled mower/conditioners, typically include a reel rotatably mounted on a header for sweeping through a standing crop and assisting and placing the crop in an upright position for cutting by a reciprocating sickle or other cutting means located below the reel. This type reel usually includes a plurality of circumferentially spaced, radially extending arms supported on a rotatable shaft driven by a suitable power source during the harvesting operation. These support arms carry a plurality of circumferentially spaced bat tubes or bat tube/bat units extending generally parallel to the rotational axis of the reel. Each bat tube or bat tube/bat unit carries a row of axially spaced tines which sweep through the crop to further assist in placing them in a proper orientation for cutting and then sweeping and lifting the severed crop material upwardly and rearwardly into an auger or conditioning rolls at an angular orientation which promotes a clean release of the severed crop material.

The bat tubes or the bat tube/bat units are rotatably mounted on the support arms and one end of each includes a cam follower which rides in a cam track extending 360° around the rotational axis of the reel. Portions of the cam track are located at different radial distances from the rotational axis of the reel so that, during rotation of the reel, the bat tubes or bat tube/bat units are rotated back and forth about their rotational axes to position the tines at the most advantageous angular orientation for each phase of the sweeping action.

Reels including similar bat tubes or bat tube/bat units and tines are used in other harvesting machines, such as pick up reels for combines, pick up attachments for hay balers and forage harvesters and hay rakes.

The tines for hay harvesting machines are faced with a problem not as commonly encountered by tines on pick up reels for combines and reels for other types of harvesting machines. The tines on hay harvesting machines often encounter plugs of wet hay or other substantially immovable obstructions which do not give. Consequently, to minimize the likelihood of permanent damage to the tines, they must deflect or give to some degree so they can ride over the plug or other obstruction. To provide this capability, the tines for hay harvesting machines typically are in the form of steel spiral springs which are slipped over and fastened to a bat tube, for example, as illustrated in FIG. 3 of U.S. Nickel et al. U.S. Pat. No. 5,007,235.

When such tines break, the broken off portion can fall into and damage the sickle and other parts of the machine and end up in livestock feed. To replace a broken tine, a bat tube must be removed, all tines between one end of the bat tube and the broken one must be unfastened and slipped off the bat tube before the broken tine can be removed and then all these tines slipped back on the bat tube and fastened after the broken tine has been replaced. For pick up reels and other type reels for harvesting machines where the tines are less apt to encounter similar obstructions, these and other shortcomings associated with metal spring tines have been minimized by using tines made from a synthetic thermoplastic or thermosetting material. However, tines made from such plastic materials cannot be deflected upon engaging a plug of wet hay or other obstruction and then return to their previous orientation. Instead, they tend to quickly become permanently deformed and ineffective for their intended purpose. Spring loading each tine would be quite difficult and costly. Accordingly, a simple means for taking advantage of tines made from a plastic material and yet minimizing permanent deformation of such tines during use is highly desirable.

Representative prior art patents disclosing reels for hay harvesting machines includes Nickel et al. U.S. Pat. No. 5,007,235. Representative prior art patents disclosing plastic tines include Hubbard U.S. Pat. No. 3,613,346, Heal et al. U.S. Pat. No. 3,796,030, Gessel et al. U.S. Pat. No. 4,520, 620 and Jasper et al. U.S. Pat. No. 4,882,899. Representative prior art patents disclosing either metal spring tines or spring load fingers for reels include Rasmussen U.S. Pat. No. 3,302,378, Gradwohl U.S. Pat. No. 3,771,299 and Kirby U.S. Pat. No. 4,255,921.

SUMMARY OF THE INVENTION

An object of the invention is to provide a reel for harvesting machines including tines made from a synthetic thermoplastic or thermosetting material and simple means for permitting the tines to ride over obstructions encountered during use.

Another object of the invention is to provide such a reel for hay harvesting machines including a cam and cam follower arrangement for adjusting the angular rotation of tines during different phases of reel rotation.

A further object of the invention is to provide such a harvesting machine reel including a bat tube carrying a row of tines and means for operably connecting a cam follower to one end of each bat tube to maintain the tube in a desired position and yet permit the entire bat tube to rotate so that the tines can ride over obstructions encountered during operation.

Other objects, aspects and advantages of the invention will become apparent to those skilled in the art upon reviewing the following detailed description, the drawings and the appended claims.

The invention provides a rotary reel for harvesting machines including a plurality of circumferentially spaced, radially extending support arms, a plurality of axially extending bat tubes rotatably supported on the outer ends of the support arms and carrying a plurality of tines at axially spaced locations along each bat tube and a bias means which biases each bat tube toward an operating position where the tines are at a predetermined angular orientation relative to the rotational axis of the reel and holds the bat tubes in the operating position during normal operation of the reel and which, in response to one or more tines engaging an obstruction, permits the respective bat tube to rotate relative to said support in a direction opposite to the rotational direction of the reel to a deflected position where the tins or tines can ride over the obstruction.

For reels to be used on hay harvesting machines, such as self-propelled or tractor-pulled mower/conditioners, having a cam mechanism including a cam follower for each bat tube which rides in a track to move the tines to different predetermined angular orientations during rotation of the reel and a cam follower support, one end of each bat tube is rotatably supported on the cam follower support and the biasing means includes a spiral spring encircling the bat tube with one end connected to the cam follower support and the other end connected to the bat tube. The spring provides sufficient tension on the bat tube to keep the tines in the operating position during normal operation and permits an entire bat tube to rotate to a deflected position when one or more tines engage an obstruction.

In a preferred embodiment, each cam follower support includes a stub shaft which extends into an axially extending cavity in one end of a bat tube and rotatably supports the bat tube, a pin in the bat tube extends into the cavity and has an outer end portion which is engaged by one end of the spring and the stub shaft has a recessed track arranged to receive the inner end portion of the pin and cooperate therewith to retain the stub shaft in place and yet permit the bat tube to rotate relative to the stub shaft. The recessed track preferably is arranged to act as a stop for limiting rotational movement of the bat tube relative to the stub shaft by the biasing force of the spring. The recessed track preferably include a keyway for receiving the inner end portion of the pin so that a stub shaft can be installed in a bat tube cavity with the pin in place.

BRIEF DESCRIPTION OF THE DRAWINGS

FIG. 4 is a view similar to FIG. 3 with an exploded view of the parts.

DESCRIPTION OF THE PREFERRED EMBODIMENTS

Reels of the invention can be used for a variety of harvesting machines including tines mounted on a bat tube or bat, such as pick up reels for combines, pick up attachments for hay balers and forage harvesters and hay rakes. It is particularly adaptable to self-propelled and tractor-pulled mower/conditioners and will be described in connection with a tractor-pulled mower/conditioner. As used herein, the term "harvesting machine" encompasses all such machines.

Figure 1:
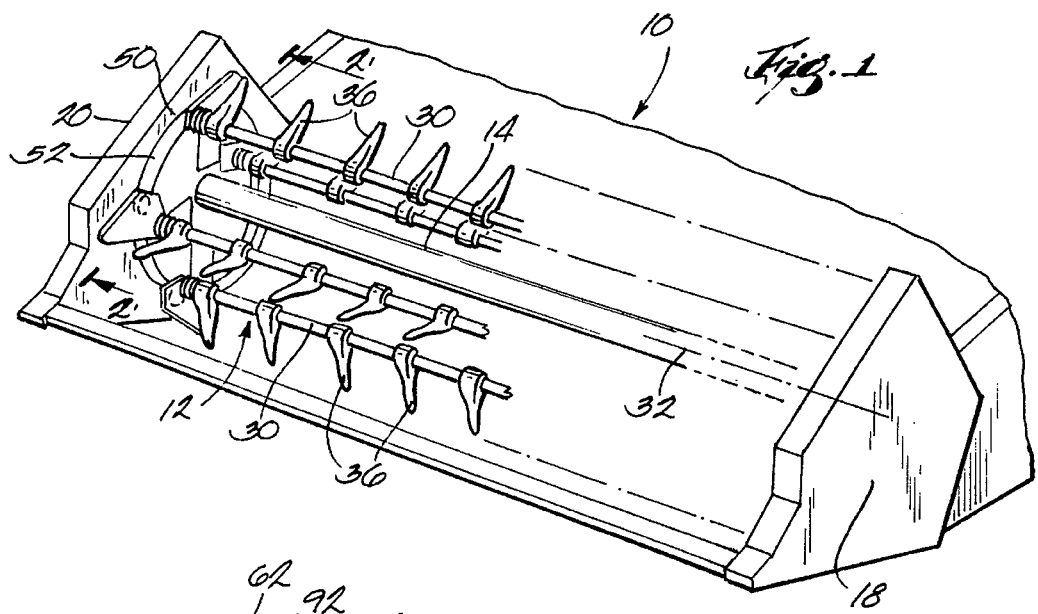
FIG. 1 is a fragmentary, front perspective view of the header for a tractor-pulled mower/conditioner including a reel embodying the invention.
Figure 2:
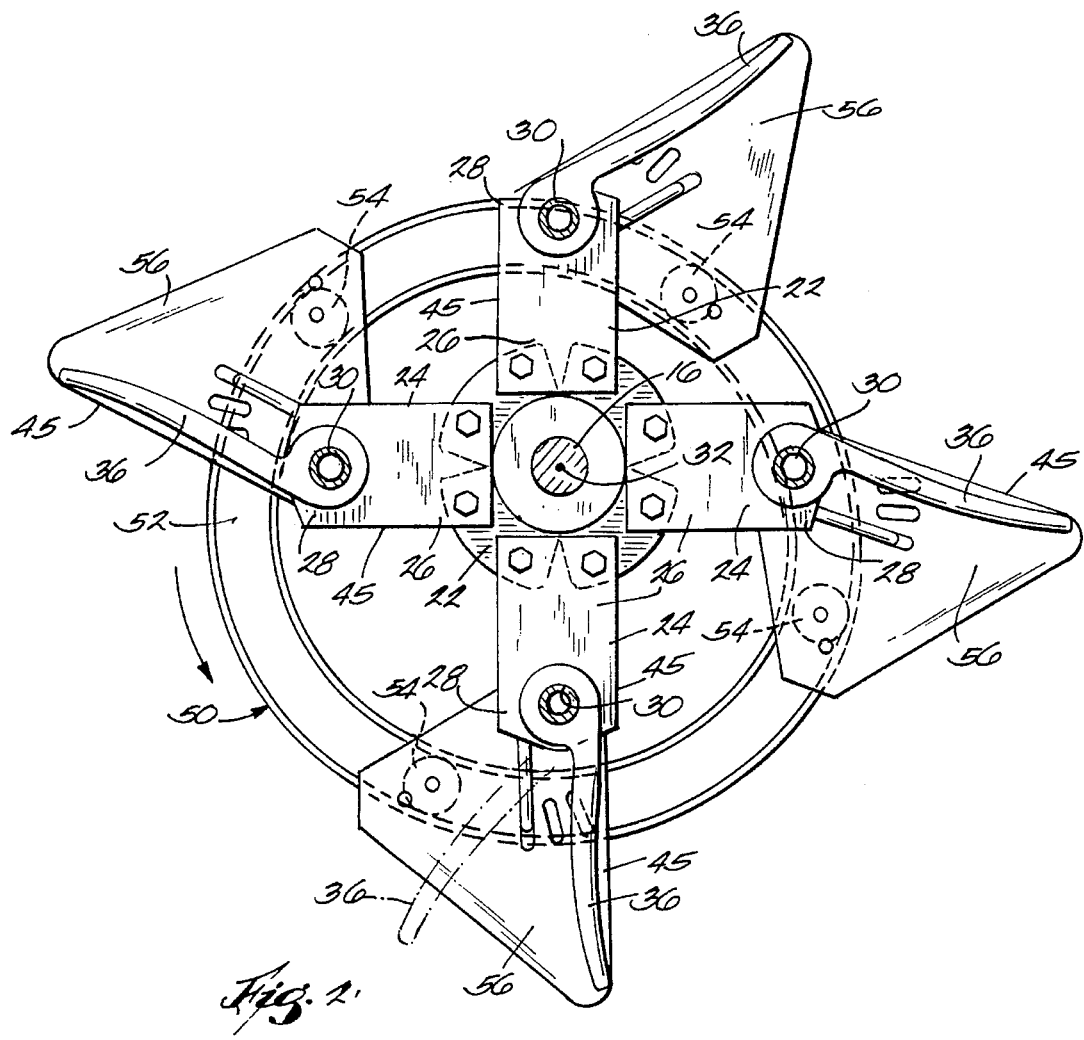
FIG. 2 is a sectional view taken generally along line 2—2 in FIG. 1.

FIGS. 1 and 2 illustrate a header 10 for a tractor-pulled type mower/conditioner incorporating a reel 12 of the invention. The reel 12 extends across the front of the header 10 and is rotatably supported from the header 10 in a conventional manner at a location above a reciprocating sickle (not shown) which also extends the full width of the header 10. As viewed in FIGS. 1 and 2, the reel 12 is rotated counterclockwise by a suitable power source, such as a conventional drive mechanism (not shown) connected to a power take off on the tractor (not shown) pulling the mower/conditioner.

The reel 12 sweeps the standing crop material rearwardly against the sickle where the material is severed and then sweeps and lifts the severed material upwardly and rearwardly toward conditioning rolls (not shown).

The reel 12 includes a cylindrical main shaft 14 including stub shafts 16 (one shown in FIG. 2) on the opposite ends suitably rotatably supported from the opposite end walls 18 and 20 of the header 10. A plurality (e.g., three) of support discs 22 are affixed to the main shaft 14 at axially spaced intervals along the main shaft 14. These intervals may be equal or unequal. Each support disc 22 carries a plurality (e.g., four) of circumferentially spaced, radially outwardly extending support arms 24, each having an inner end 26 affixed to a support disc 22 and an outer end 28. All the support arms 24 are axially aligned.

A one-piece, axially extending bat tube 30 is suitably supported on the outer ends 28 of each set of three axially aligned support arms 24 for rotation relative to the support arms 24. The bat tube 30 extends generally parallel to the rotational axis 32 of the reel 12 and has opposed ends 24 (one shown in FIGS. 3 and 4). Each bat tube 30 carries a plurality of tines 36 which are axially spaced at equal or unequal intervals along the length of the bat tube 30.

While the tines 36 can be made from a variety of suitable materials, including steel, they preferably are molded as a one-piece unit from a synthetic thermoplastic or thermosetting material, such as Nylon 6 marketed by DuPont.

Figure 3:
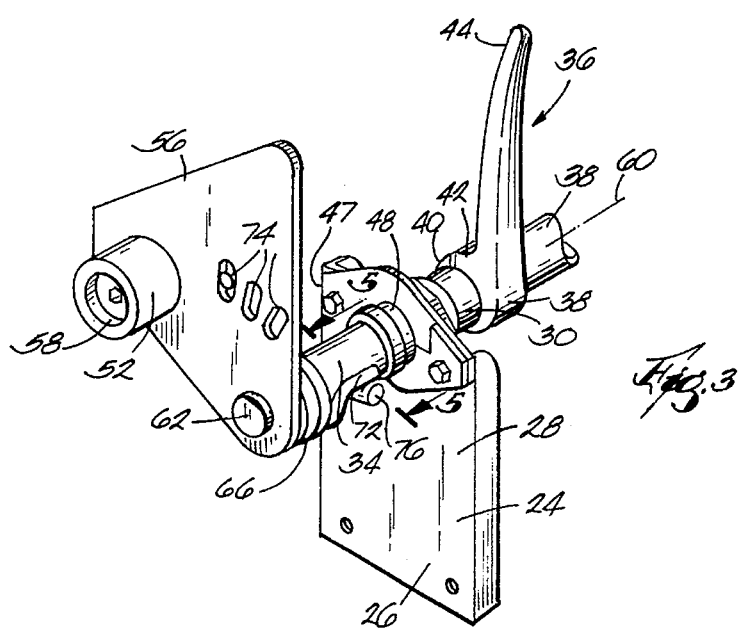
FIG. 3 is an enlarged, fragmentary view of one support arm, a cam follower support, a portion of a bat tube and a tine for the reel illustrated in FIGS. 1 and 2.

In the preferred embodiment illustrated, the tines 36 are constructed generally in accordance with U.S. Jasper et al. Pat. No. 4,882,899 ("Jasper Patent") which is incorporated herein by reference. Referring to FIGS. 3 and 4, the general construction of the tines 36 will be described by comparison to the tines 14 illustrated in the Jasper Patent with the reference numerals for similar parts in the Jasper Patent in parenthesis. Each tine 36 (14) includes a split ring section 38 (22) having end sections 40 (38) and 42 (40) and a finger 44 (26) connected to and extending from the split ring section 38 (22). Each tine 36 (14) includes a protrusion (not shown) (56) on the inside surface of the split ring section 38 (22) which fits into a matching hole (not shown) in the bat tube 30 (12). The end sections 40 (38) and 42 (40) are spread apart far enough for the split ring section 38 (22) to be slipped over a bat tube 30 (12). After the protrusion (56) is inserted into the matching hole in the bat tube, the end sections 40 (38) and 42 (40) are clamped together by a screw (not shown) (24) and the tine 36 (14) is secured in place on the bat tube 30 (12).

If a tine 36 (14) is broken or becomes deformed, it can be replaced by simply removing the screw, spreading the end sections 40 (38) and 42 (40) far enough apart to slip the split ring section 38 (22) off the bat tube 30 (12) and a new tine 36 (14) installed on the bat tube 30 (12) in the manner described above.

While the reel 12 illustrated in the drawings does not include a bat, one of conventional design can be mounted on the leading edges 47 of each set of support arms 24. Also, instead of being mounted directly on a bat tube 30 as illustrated, the tines 36 can be mounted on a bat which in turn is mounted on a bat tube 30 for common rotation therewith. As used herein, the term "bat tube" includes both a bat-less bat tube as illustrated or a bat tube/bat unit arrangement for carrying the tines.

As mentioned above, each bat tube 30 is suitably supported on the outer ends 28 of a support arm 24 in each of the four sets of support arms 24 for rotation relative to the support arms 24, such as by a conventional bearing assembly 48 (FIGS. 2 and 3).

The angular orientation of the tines 36 during rotation of the reel 12 is controlled by a cam mechanism 50 located at either side of the header 10. In the construction illustrated, the cam mechanism is located at the left side of the header 10 as viewed in FIG. 1. The cam mechanism 50 (FIGS. 1 and 2) includes a conventional track 52 which extends 360° around the rotational axis 32 of the reel 12 and has portions which are located in a conventional manner at different radial distances from that axis. As best shown in FIGS. 3 and 4, the cam mechanism 50 also includes for each bat tube 30 a cam follower 54 which engages the track 52 and is mounted on a cam follower support or crank arm 56 by a threaded pin 58, which is secured in place on the crank arm 56 by a nut 59. Each crank arm 56 is connected to the end 34 of the respective bat tube 30 so that, as the reel 12 rotates in a counterclockwise direction as viewed in FIG. 2, the cam followers 54 ride along within the track 52 to cause the crank arms 56, and thus the bat tubes 30 and tines 36, to be pivoted back and forth about the rotational axes of the bat tubes 30.

The structural features of the reel 12 described up to this point are generally conventional. The invention provides means for biasing the bat tubes 30 relative to their rotational axes 60 to an operating position where the tines 36 are at a predetermined angular orientation as shown by solid lines in FIG. 2. In response to one or more tines 36 encountering a plug of wet hay or another substantially immovable obstruction, this bias means permits the entire respective bat tube 30 to rotate relative to the respective support arms 24 in a direction opposite to the rotational direction of the reel 12 to a deflected position shown by dashed lines for the bottom tine in FIG. 2 where the tine(s) 36 can ride over the obstruction.

In the specific embodiment illustrated in FIGS. 1–6, such means comprises the crank arm 56 being in the form of a plate supporting a cam follower 54 and carrying a stub shaft 62 (FIG. 4) which is rotatably received in an axially extending cavity 64 in the end 34 of a bat tube 30 and a spiral spring 66 encircling the outer surface 68 of the bat tube 30 with one end 70 connected to the plate 56 and the other end 72 connected to the bat tube 30. The spring 66 supplies a sufficient biasing force or tension on the bat tube 30 to hold it in the operating position so that the tines 36 remain in the desired angular orientation during normal operations.

If one or more tines 36 engage a plug of wet hay or other substantially immovable obstruction, the spring 66 permits the respective bat tube 30 to rotate in a clockwise direction as viewed in FIGS. 1 and 2 to a deflected position where the tine(s) 36 can ride over the obstruction. Once the tine(s) 36 has moved past the obstruction, the spring 66 returns the bat tube 30 and the tines 36 to the operating position. The plate 56 includes means for retaining the end 70 of the spring 66. In the specific construction illustrated, the plate 56 is provided with a plurality of oblong apertures 74 for that purpose. The apertures 74 are circumferentially spaced relative to the rotational axis 60 of a bat tube 30 so that the biasing force or tension of the spring 66 applies to the bat tubes 30 can be adjusted by installing the end 70 of the spring 68 in different apertures 74. The retaining means can be a single aperture when there is no need to adjust spring tension. Also, something other than an aperture, which is capable of restraining rotational movement of the end 70 of the spring 68 relative to the plate 56, can be used.

Figure 6:
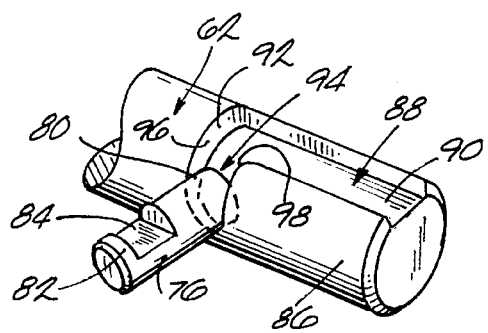
FIG. 6 is a fragmentary, perspective view of the end of a cam follower support stub shaft shown removed from a bat tube but with a bat tube pin.
Figure 5:
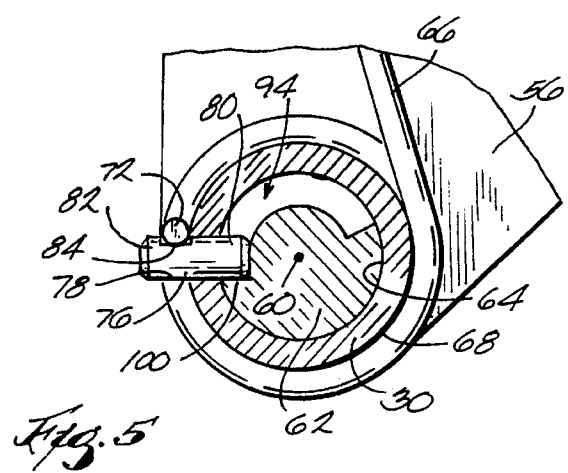
FIG. 5 is a sectional view taken generally along line 5—5 in FIG. 3.

Various suitable means can be used to retain the stub shaft 62 in place inside a bat tube cavity 64. In the specific embodiment illustrated, the bat tube 30 includes a pin 76 which extends through an aperture 78 in the bat tube 30 and partially through the bat tube cavity 64. As best shown in FIGS. 5 and 6, the pin 78 has an inner end portion 80 located inside the bat tube cavity 64 and an outer end portion 82 extending radially outwardly from the outer surface 64 of the bat tube. The outer end portion 82 of the pins 76 has a notch 84 which receives the end 72 of the spring 66. Other suitable arrangements can be used. For example, the pin 76 can be L-shaped in which case the end 72 of the spring 66 would be turned outwardly 90° from the position shown in FIG. 4. The end 70 of the spring 66 can be straight in which case the crank arm 56 would have a pin, tab or the like for restraining that end.

FIG. 5 illustrates the relative positions of the bat tube 30, the stub shaft 62 and the pin 76 when the spring 66 is installed and the bat tube 30 is in the operational position. FIG. 6 illustrates the relative position of the stub shaft 62 and the pin 76 after the stub shaft 62 is installed in the bat tube 30 and before installation of the spring 66. For the sake of clarity, the stub shaft 62 and pin 76 in FIG. 6 are rotated clockwise approximately 30° from the position illustrated in FIG. 6.

Machined or otherwise suitably formed in the outer surface of the inner end portion 86 of each stub shaft 62 is a recessed track 88 for receiving the inner end portion 80 of the pin 76. The track 88 has an axially extending portion or keyway 90 which is alignable with the inner end portion 80 of the pin 76 when the stub shaft 62 is oriented in an installation position, i.e., rotated counterclockwise approximately 90° from the position illustrated in FIG. 6. The keyway 90 has end wall 92 and is arranged to permit the stub shaft 62 to be moved into the bat tube cavity 64 to a home position where the keyway end wall 92 engages the inner end portion 80 of the pin 76. The track 88 also includes a seat portion 94 connected to the keyway 90 for receiving the inner end portion 80 of the pin 76 and permitting rotational movement of the bat tube 30 relative to the stub shaft 62. The seat portion 94 extends circumferentially and generally parallel relative to a plane intersecting and extending generally perpendicularly to the rotational axis 60 of the bat tube 30. The seat portion 94 has opposed side walls 96 and 98 which guide movement of the inner end portion 80 of the pin 76 during rotation of the bat tube 30 relative to the stub shaft 62 and an end wall 100 which serves as a stop for limiting rotational movement of the bat tube 30 relative to the stub shaft 62 in a clockwise direction as viewed in FIG. 5 by the biasing force of the spring 66. The end wall 100 is parallel to the pin 76 when engaged by the pin 76.

During installation, the stub shaft 62 is oriented relative to the bat tube 30 to align the keyway 90 with the inner end portion 80 of the pin 76, then moved into the bat tube cavity 64 until it reaches the home position and then rotated counterclockwise as viewed in FIG. 6 to a location circumferentially spaced away from the keyway 90 where the inner end portion 80 of the pin 76 and the seat portion side walls 96 and 98 cooperate to retain the stub shaft against axial movement relative to the bat tube 30.

When the spring 66 is installed, the end 72 bears against the outer end portion 82 of the pin 76 and urges the bat tube 30 in a counterclockwise direction as viewed in FIG. 5 until the inner end portion 80 of the pin 76 engages the seat portion end wall 100. During normal operation, the spring 66 maintains the tines at the desired angular orientation as the cam follower 54 moves along the cam track 52 during rotation of the reel 12. When one or more tines 36 engage a plug of wet hay or the like, the spring 66 permits the bat tube to rotate in a clockwise direction as viewed in FIG. 5 a sufficient degree to permit the tine or tines to ride over the plug and the spring 66 thereafter returns the bat tube 30 to the operating position. The circumferential dimension of the seat portion 94 preferably is long enough to prevent the inner end portion 80 of the pin 76 from reaching and possibly becoming lodged in the keyway 90 during this clockwise movement of the bat tube 30. As a guide, the end wall 100 of the seat portion 94 can be located in the order of 150°–180° from the center line of the keyway 90.

Figure 7:
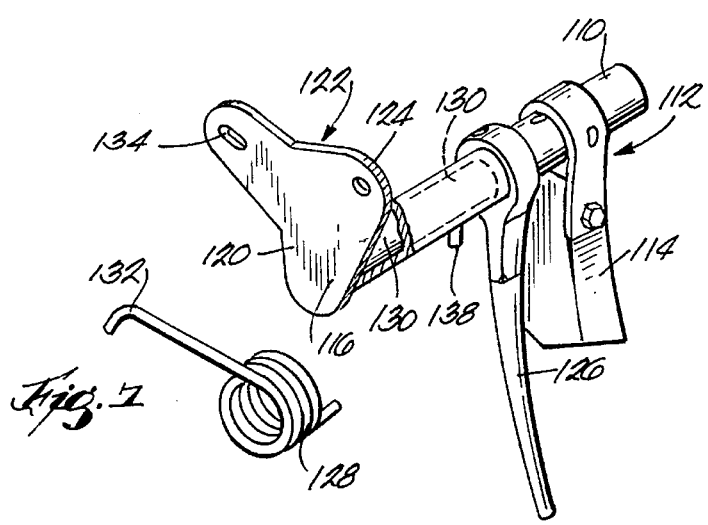
FIG. 7 is a fragmentary, partially exploded view of parts for an alternate embodiment of the invention.
Figure 1:
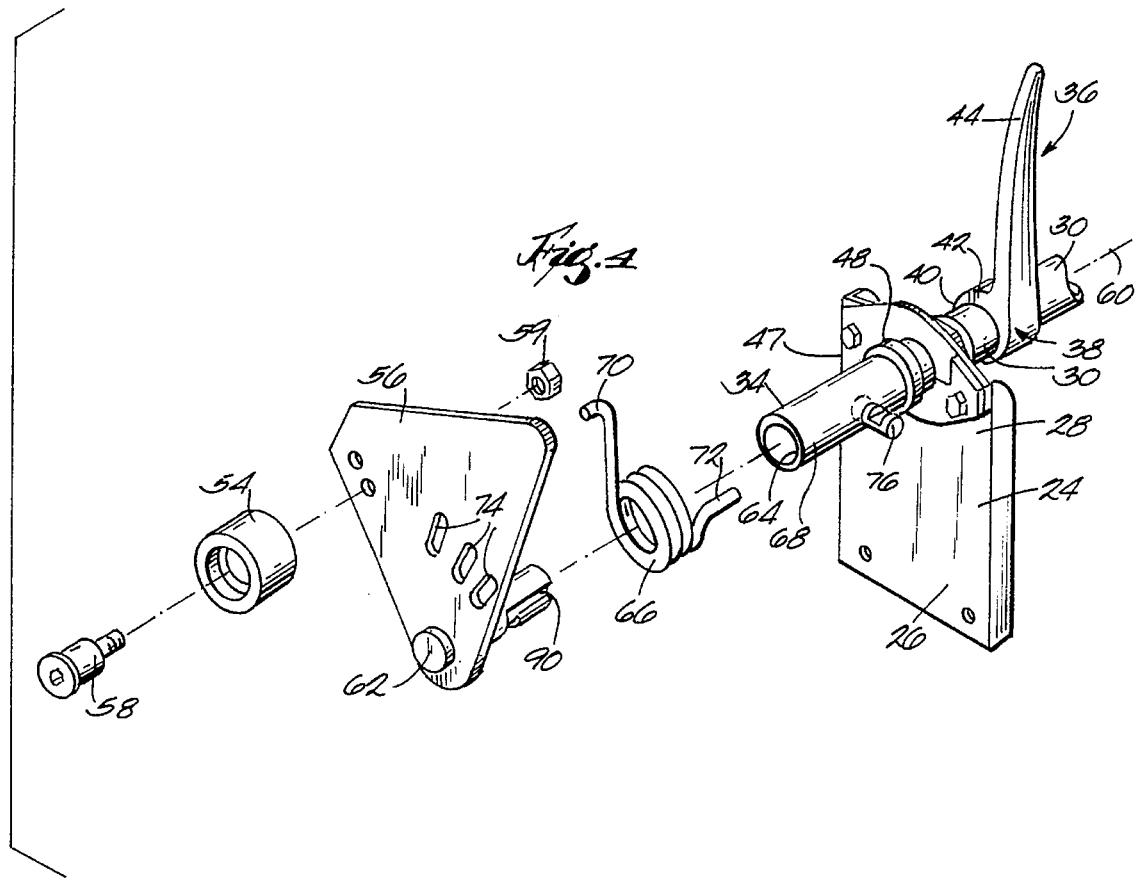

FIG. 7 illustrates an alternate embodiment of the invention employed in a pick up reel for a combine or the like arranged so that the tines are maintained at substantially the same attitude or pitch throughout rotation. In this type reel, bat tubes 110 (one shown) are rotatably mounted on the outer ends 112 of support arms 114 (one shown) in a manner similar to that described above and an eccentric shield (not shown) is located adjacent one end 116 of the bat tubes 110. The eccentric shield is of conventional design, does not comprise a material part of the invention and a full illustration and/or description of same is not required to fully understand the invention. Accordingly, a detailed description of the eccentric shield is omitted for the sake of brevity. The shield has a hub offset from the center of the shield and mounted for rotation of the shield about an axis offset from the rotational axis of the support arms 114.

One part 120 of a crank arm 122 is rigidly secured to the end 116 of each bat tube 110 adjacent the shield. Another part 124 of the crank arm 122 is connected in the usual manner to the shield at a location radially offset from the rotational axis of the respective bat tube at the same distance as the offset of the shell hub. As the reel is rotated during operation and the shield rotates about its eccentric axis, each crank arm 122 rotates relative to the rotational axis of the respective bat tube 110 and thereby moves the bat tube 110 to a position where the tines 126 are maintained in the same attitude or pitch throughout rotation.

Each bat tube 110 is biased to the desired position by a spiral spring 128 which serves the same function as the spring 66 described above and, in response to a tine or tines 112 on the respective bat tube encountering an obstruction, permits the entire bat tube 110 to rotate in a direction opposite to the rotational direction of the reel to a deflected position where the tine(s) 112 can ride over the obstruction and then returns the bat tube 110 to the operating position in the same manner described above. The spiral spring 128 is shown in an uninstalled position for the sake of clarity.

In the specific embodiment illustrated in FIG. 7, the crank arm 122 is in the form of a plate and has a solid stub shaft 130 which is rotatably received in an axially extending cavity in the end 116 of each bat tube 110. The spiral spring 128 encircles the outer surface of the bat tube 110 between the support arm 114 and the crank arm 122 with one end 132 extending into an aperture 134 in the crank arm 122 and the other end 136 bearing against a radially outwardly extending pin 138 on the bat tube 110.

The pin 138, the end 116 of the bat tube 110 and the stub shaft 130 are arranged and function in the manner described above in a connection with the embodiment illustrated in FIGS. 14. That is, the pin 138 extends into the bat tube cavity and the stub shaft 130 has a track like track 88 and a keyway like keyway 90.

In the embodiment illustrated in FIG. 7, a tine 126 is located between the support arms 114 and the crank arm 122. A similar arrangement also can be used with the embodiment illustrated in FIGS. 1–6.

From the foregoing description, one skilled in the art can easily ascertain the essential characteristics of the invention and, without departing from the spirit and scope thereof, make various changes and modifications to adapt it to various usages.

We claim:

1. A reel for a harvesting machine comprising an elongated shaft having opposed ends, mounted for rotation about a transverse axis during operation and carrying a plurality of sets of circumferentially spaced, radially extending support arms mounted at axially spaced locations along said shaft, said support arms having outer end portions;

a plurality of axially extending bat tubes equal in number to said support arms in each set, each of said bat tubes mounted on the outer end portions of said support arms for rotation about an axis relative to said support arms and having opposed ends;

a plurality of tines mounted at axially spaced locations along each of said bat tubes for common rotation therewith; and bias means operably connected to each of said bat tubes which applies a biasing force on said bat tube to hold it in an operating position wherein said tines are at a predetermined angular orientation relative to the rotational axis of said reel and which, in response to one or more of said tines engaging an obstruction, permits the respective bat tube to rotate relative to said support arms against said biasing force, in a direction opposite to the rotational direction of said reel, to a deflected position where said tines can ride over the obstruction.

2. A reel according to claim 1 where said tines are made from a synthetic thermoplastic or thermosetting material.

3. A reel according to claim 1 wherein said bias means comprises a spring connected between one end of a said bat tube and a part separate from said bat tube and mounted for common rotation with said shaft.

4. A reel according to claim 1 wherein the harvesting machine includes a cam mechanism at end of said reel comprising a stationary track which extends 360° around the rotational axis of said reel and has portions disposed at different radial distances from the rotational axis of said reel; and said reel further includes a cam follower support for each of said bat tubes carrying a cam follower which rides in said track during rotation of said reel, and connecting means for operably connecting each of said cam follower supports to one end of a said bat tube for rotation of said bat tube relative to said cam follower support such that, during rotation of said reel, said cam follower causes said bat tubes to be rotated back and forth about the rotational axes thereof to change the angular orientation of said tines, said connecting means comprising a spring connected between said cam follower support and said bat tube and also serving as said biasing means.

5. A reel according to claim 4 wherein said one end of each bat tube includes an axially extending cavity; and each of said cam follower supports includes a stub shaft mounted in the cavity in said one end of the respective bat tube for affording rotation of said bat tube relative to said stub shaft.

6. A reel according to claim 4 wherein said one end of each bat tube has an outer surface;

each of said cam follower supports includes a plate carrying a said cam follower and a said stub shaft; and said spring comprises a spiral spring encircling the outer surface of said one end of each bat tube and having one end connected to said plate and the other end connected to said bat tube.

7. A reel according to claim 6 wherein each of said stub shafts has an outer surface and a recessed track in the outer surface including a seat portion extending circumferentially and generally parallel to a plane intersecting and extending generally perpendicularly to the rotational axis of said bat tube; and a pin for each bat tube having an outer portion extending radially outwardly from the outer surface of said bat tube and engaged by the other end of said spring and an inner portion extending into said bat tube cavity and received in the seat portion of said recessed track, said seat portion being arranged to cooperate with the inner end portion of said pin to restrict axial movement of said stub shaft relative to said bat tube and thereby retain said stub shaft in said bat tube cavity and to permit rotation of said bat tube relative to said stub shaft.

8. A reel according to claim 7 wherein the track in said stub shaft includes an end wall which is engaged by the inner end portion of said pin to limit rotational movement of said bat tube relative to said stub shaft by the biasing force of said spring.

9. A reel according to claim 7 wherein said recessed track includes a keyway connected with and extending axially and generally perpendicularly to said seat portion for receiving the inner portion of said pin and permitting said stub shaft to installed in said bat tube cavity with said pin in place.

10. A reel for a crop harvesting machine comprising an elongated shaft having opposed ends, mounted for rotation about a transverse axis during operation and carrying a plurality of sets of circumferentially spaced, radially extending support arms mounted at axially spaced locations along said shaft, said support arms having outer end portions;

a plurality of axially extending bat tubes equal in number to said support arms in each set, each of said bat tubes mounted on the outer end portions of said support arms for rotation relative to said support arms and having opposed ends;

a plurality of tines made from a synthetic thermoplastic or thermosetting material mounted at axially spaced locations along each of said bat tubes for common rotation therewith; and bias means, operably connected to each of said bat tubes which applies a biasing force on said bat tube to hold it in an operating position where said tines are at a predetermined angular orientation relative to the rotational axis of said reel during normal operation and which, in response to one or more of said tines engaging an obstruction, permits the respective bat tube to rotate relative to said support arms against said biasing force, in a direction opposite to the rotational direction of said reel, to a deflected position where said tines can ride over the obstruction.

11. A reel according to claim 10 wherein the harvesting machine includes a cam mechanism at the end of said reel comprising a stationary track which extends 360° around the rotational axis of said reel and has portions disposed at different radial distances from the rotational axis of said reel; and said reel further includes a cam follower support for each of said bat tubes carrying a cam follower which rides in said track during rotation of said reel, and connecting means for operably connecting each of said cam follower supports to one end of a said bat tube for rotation of said bat tube relative to said cam follower support such that, during rotation of said reel, said cam follower causes said bat tubes to be rotated back and forth about the rotational axes thereof to change the angular orientation of said tines, said connecting means comprising a spring connected between said cam follower support and said bat tube and also serving as said biasing means.

12. A reel according to claim 11 wherein said bias means and said connecting means comprises a spring connected between said cam follower support and said bat tube.

13. A reel according to claim 12 wherein said one end of each bat tube includes an axially extending cavity; and each of said cam follower supports includes a stub shaft mounted in the cavity in said one end of the respective bat tube for affording rotation of said bat tube relative to said stub shaft.

14. A reel according to claim 13 wherein said one end of each bat tube has an outer surface;

each of said cam follower supports includes a plate carrying a said cam follower and a said stub shaft; and said spring comprises a spiral spring encircling the outer surface of said one end of each bat tube and having one end connected to said plate and the other end connected to said bat tube.

15. A reel according to claim 14 wherein each of said stub shafts has an outer surface and a recessed track in the outer surface including a seat portion extending circumferentially and generally parallel to a plane intersecting and extending perpendicularly to the rotational axis of said bat tube;

a pin for each bat tube having an outer portion extending radially outwardly from the outer surface of said bat tube and engaged by the other end of said spring and an inner portion extending into said bat tube cavity and received in the seat portion of said recessed track, said seat portion being arranged to cooperate with the inner end portion of said pin to restrict axial movement of said stub shaft relative to said bat tube and thereby retain said stub shaft in said bat tube cavity and to permit rotation of said bat tube relative to said stub shaft.

16. A reel according to claim 14 wherein said recessed track includes an end wall which is engaged by the inner end portion of said pin to limit rotational movement of said bat tube relative to said stub shaft by the biasing force of said spring.

17. A reel according to claim 16 wherein said recessed track includes a keyway connected with and extending axially and generally perpendicularly to said seat portion for receiving the inner portion of said pin and permitting said stub shaft to installed in said bat tube cavity with said pin in place.

* * * * *